United States Patent
Ishibashi et al.

(10) Patent No.: US 8,018,426 B2
(45) Date of Patent: Sep. 13, 2011

(54) LCD DISPLAY WITH INTEGRATED SOLAR CELLS

(75) Inventors: Yoshihito Ishibashi, Tokyo (JP); Kentaro Odaka, Tokyo (JP); Shoji Nagai, Tokyo (JP); Fumio Kubono, Tokyo (JP)

(73) Assignee: Sony Corporation, Tokyo (JP)

( * ) Notice: Subject to any disclaimer, the term of this patent is extended or adjusted under 35 U.S.C. 154(b) by 609 days.

(21) Appl. No.: 11/773,327

(22) Filed: Jul. 3, 2007

(65) Prior Publication Data

US 2008/0122780 A1 May 29, 2008

(30) Foreign Application Priority Data

Jul. 4, 2006 (JP) .................................. 2006-184688

(51) Int. Cl.
*G09G 3/36* (2006.01)
(52) U.S. Cl. ....................................................... 345/102
(58) Field of Classification Search .................. 345/102, 345/87, 88, 84, 55, 30; 136/263, 355, 256; 349/106, 114
See application file for complete search history.

(56) References Cited

U.S. PATENT DOCUMENTS

| | | | | |
|---|---|---|---|---|
| 5,048,925 A | * | 9/1991 | Gerritsen et al. | 359/569 |
| 6,310,282 B1 | * | 10/2001 | Sakurai et al. | 136/263 |
| 2004/0017524 A1 | * | 1/2004 | Li | 349/106 |
| 2004/0074531 A1 | * | 4/2004 | Matsui et al. | 136/244 |
| 2005/0117096 A1 | * | 6/2005 | Voloschenko et al. | 349/114 |

FOREIGN PATENT DOCUMENTS

| | | |
|---|---|---|
| JP | 2001-338273 | 12/2001 |
| JP | 2002-229472 | 8/2002 |
| JP | 2003-167233 | 6/2003 |
| JP | 2006-53206 | 2/2006 |

* cited by examiner

*Primary Examiner* — Richard Hjerpe
*Assistant Examiner* — Jeffrey Parker
(74) *Attorney, Agent, or Firm* — Finnegan, Henderson, Farabow, Garrett & Dunner, L.L.P.

(57) ABSTRACT

Disclosed herein is an electronic device including: a solar cell configured to be inferior in absorption efficiency for light having a predetermined wavelength; and a reflective display configured to carry out displaying by reflecting light having the predetermined wavelength and allow transmission of light other than light having the predetermined wavelength. In the electronic device, the reflective display is disposed on an outside face of a device package, and the solar cell is disposed on a backside of the reflective display.

4 Claims, 9 Drawing Sheets

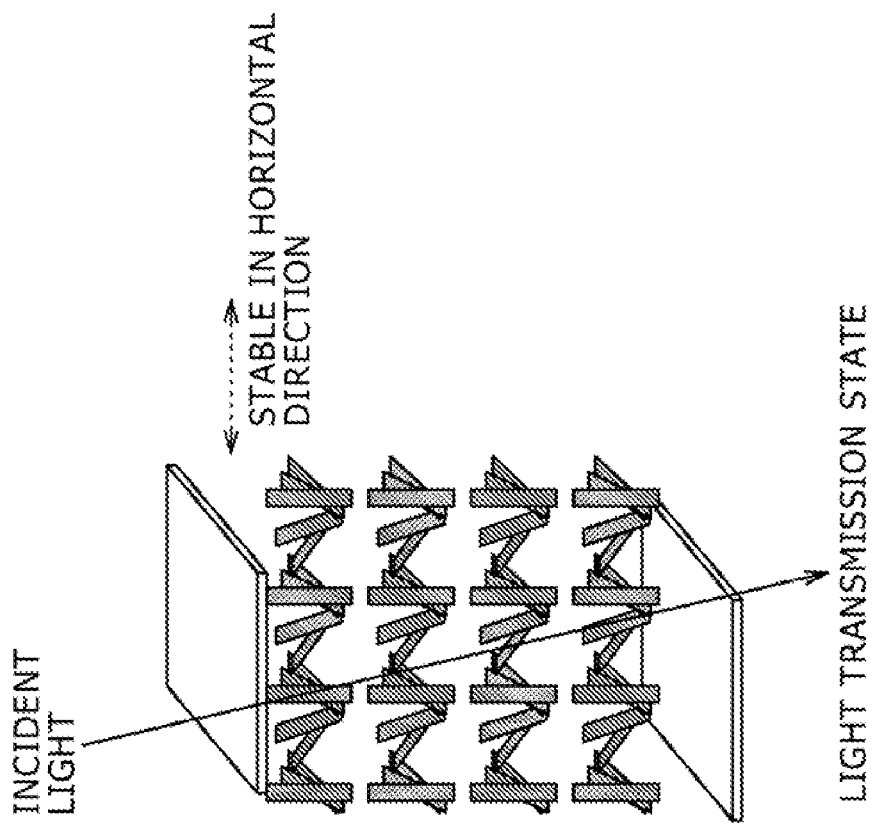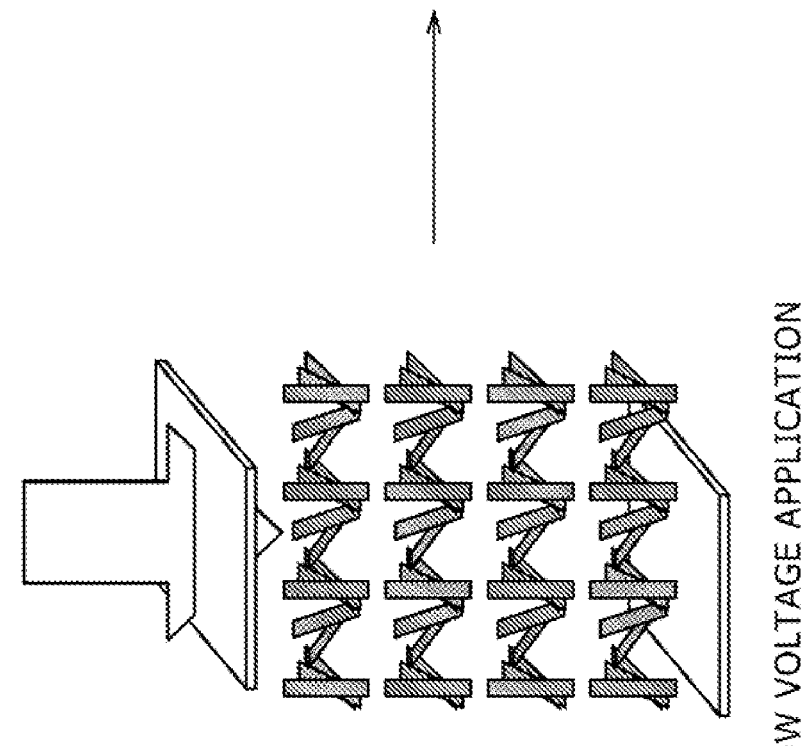

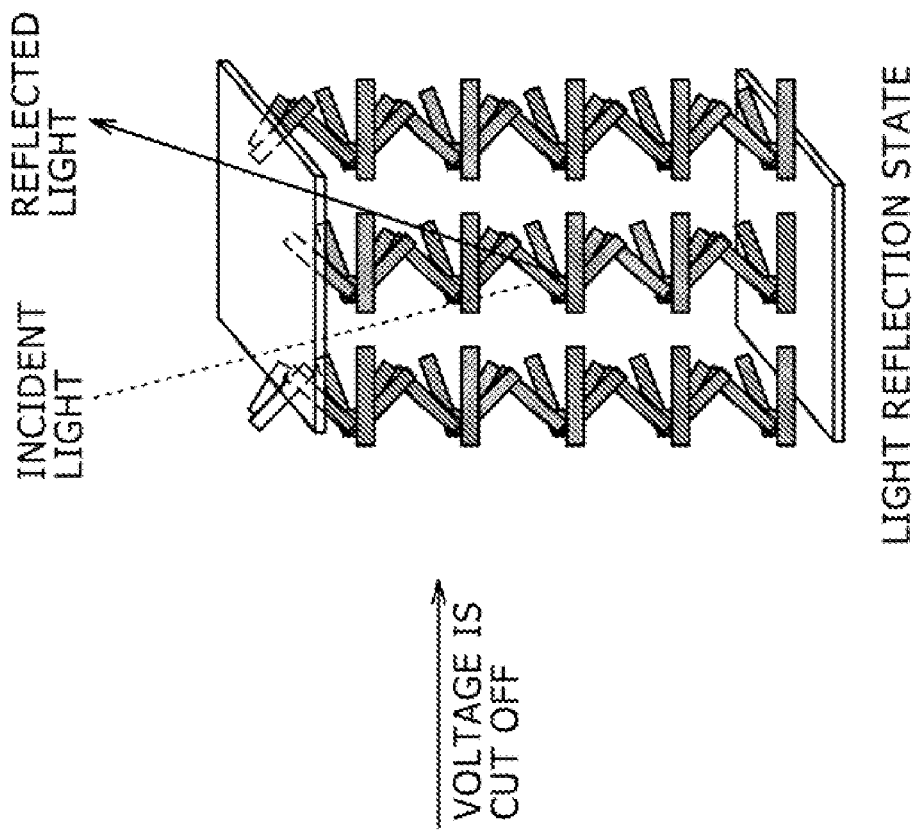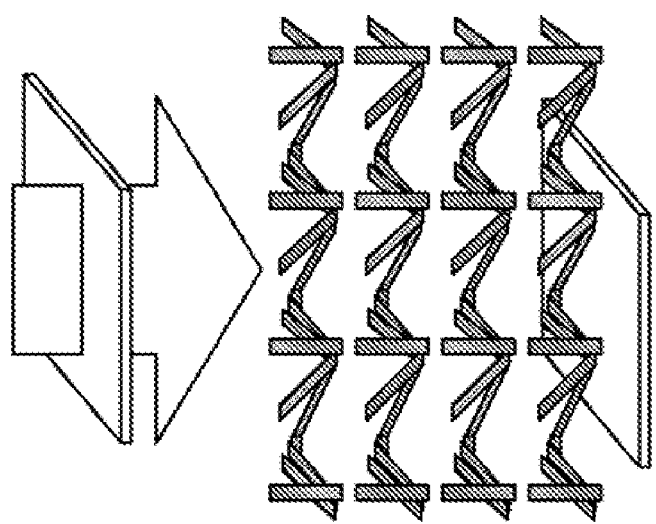

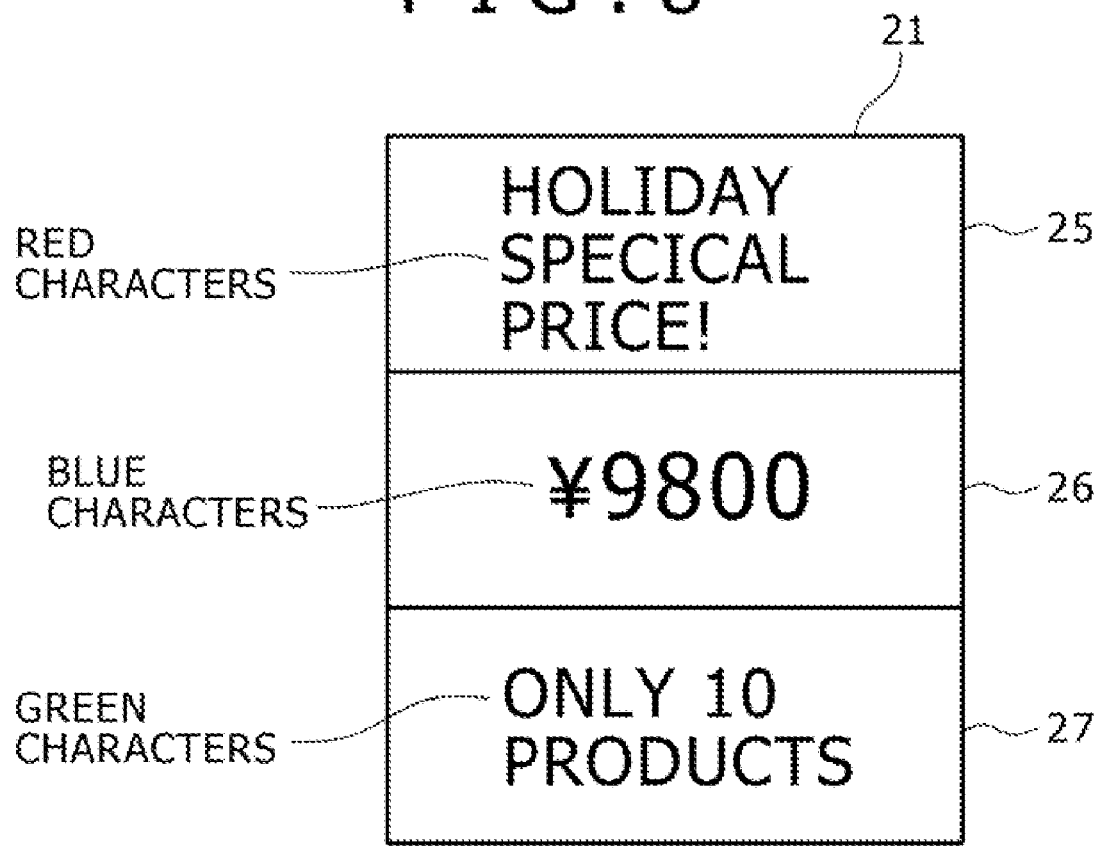

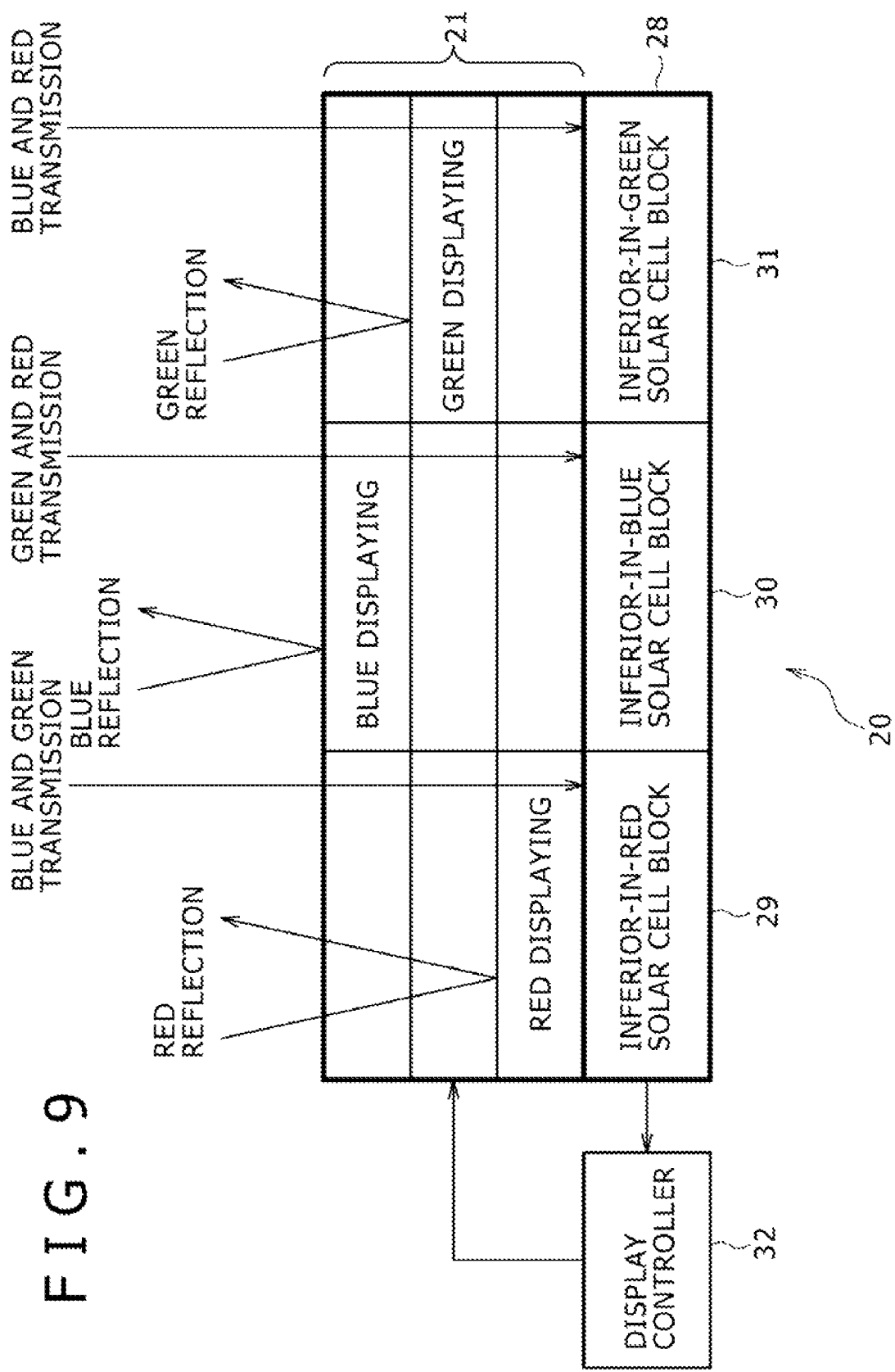

LCD DISPLAY WITH INTEGRATED SOLAR CELLS

CROSS REFERENCES TO RELATED APPLICATIONS

The present invention contains subject matter related to Japanese Patent Application JP 2006-184688 filed in the Japan Patent Office on Jul. 4, 2006, the entire contents of which being incorporated herein by reference.

BACKGROUND OF THE INVENTION

1. Field of the Invention

The present invention relates to electronic devices, and particularly to an electronic device that is allowed to include a solar cell disposed on the backside of a reflective display that displays characters, graphics, and so on, with no variation in the power generation efficiency of the solar cell.

2. Description of the Related Art

When an electronic device is provided with a solar cell, it is desirable for the solar cell to be provided on an outside face of the electronic device for efficient reception of irradiation light. However, when a small electronic device is provided with a display and a solar cell, the need to consider the arrangement of the display and the solar cell arises because the display needs to be provided on an outside face of the small electronic device.

As a method for efficiently arranging a display and a solar cell, there has been proposed e.g. a method in which, as shown in FIG. 1, an electronic paper 1 employing a polymer network liquid crystal is employed as a display and a solar cell 2 is disposed on the backside of the electronic paper 1 (refer to e.g. Japanese Patent Laid-Open No. 2001-338273).

SUMMARY OF THE INVENTION

In the existing configuration example shown in FIG. 1, as shown in FIG. 2, of the entire display area of the electronic paper 1, an area in which characters and graphics are not displayed (non-displaying area 11) allows the transmission of irradiation light, while an area in which characters and graphics are displayed (displaying area 12) does not allow the transmission of irradiation light but reflects the light. Therefore, some extent of power generation efficiency (about 30 to 50%) will be obtained due to the irradiation light that transmits through the non-displaying area 11 according to the above-mentioned patent document.

However, in this existing method, the power generation efficiency changes depending on the displayed content on the electronic paper, and therefore current control is difficult. Consequently, the electronic device is designed in consideration of the worst case regarding the power generation efficiency.

There is a need for the present invention to allow a solar cell to be disposed on the backside of a display in such a manner that the displayed content on the display has no influence on the power generation efficiency of the solar cell.

According to one embodiment of the present invention, there is provided an electronic device that includes a solar cell configured to be inferior in the absorption efficiency for light having a predetermined wavelength, and a reflective display configured to carry out displaying by reflecting light having the predetermined wavelength and allow the transmission of light other than light having the predetermined wavelength. The reflective display is disposed on an outside face of the device package, and the solar cell is disposed on the backside of the reflective display.

In the electronic device according to one embodiment of the present invention, on the solar cell that is inferior in the absorption efficiency for light having a predetermined wavelength and is disposed on the backside of the reflective display that carries out displaying by reflecting the light having the predetermined wavelength and allows the transmission of light other than the light having the predetermined wavelength, light other than the light having the predetermined wavelength that has passed through the reflective display is incident, which leads to power generation.

One embodiment of the present invention allows a solar cell to be disposed on the backside of a display in such a manner that the displayed content on the display has no influence on the power generation efficiency of the solar cell.

BRIEF DESCRIPTION OF THE DRAWINGS

FIGS. 6A and 6B are diagrams for explaining the characteristic of a display layer of a full-color electronic paper;

FIGS. 7A and 7B are diagrams for explaining the characteristic of a display layer of a full-color electronic paper;

FIG. 8 is a diagram showing a displaying example of the full-color electronic paper of FIG. 3;

FIG. 9 is a diagram for explaining the power generation efficiency in the display device of FIG. 3;

DETAILED DESCRIPTION OF THE PREFERRED EMBODIMENTS

Embodiments of the present invention will be described in detail below with reference to the drawings.

Figure 1:
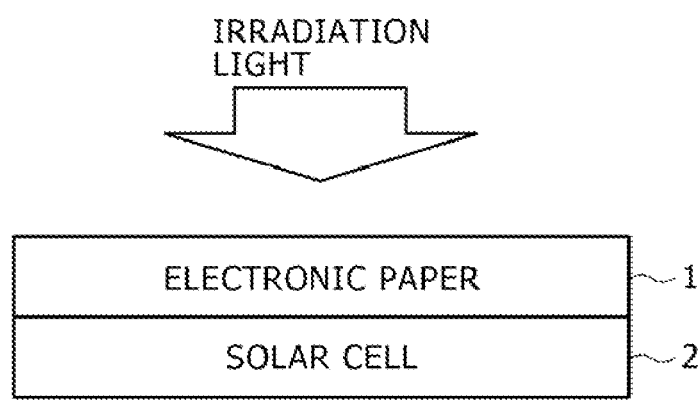
FIG. 1 is a block diagram showing an existing configuration example of an electronic device including a display and a power generating element.
Figure 2:
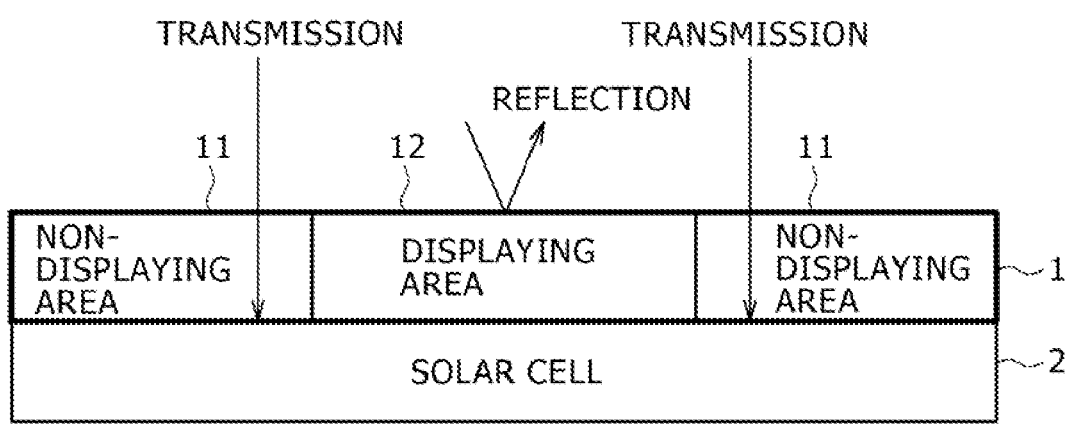
FIG. 2 is a diagram for explaining the power generation efficiency in the configuration example of FIG. 1.
Figure 3:
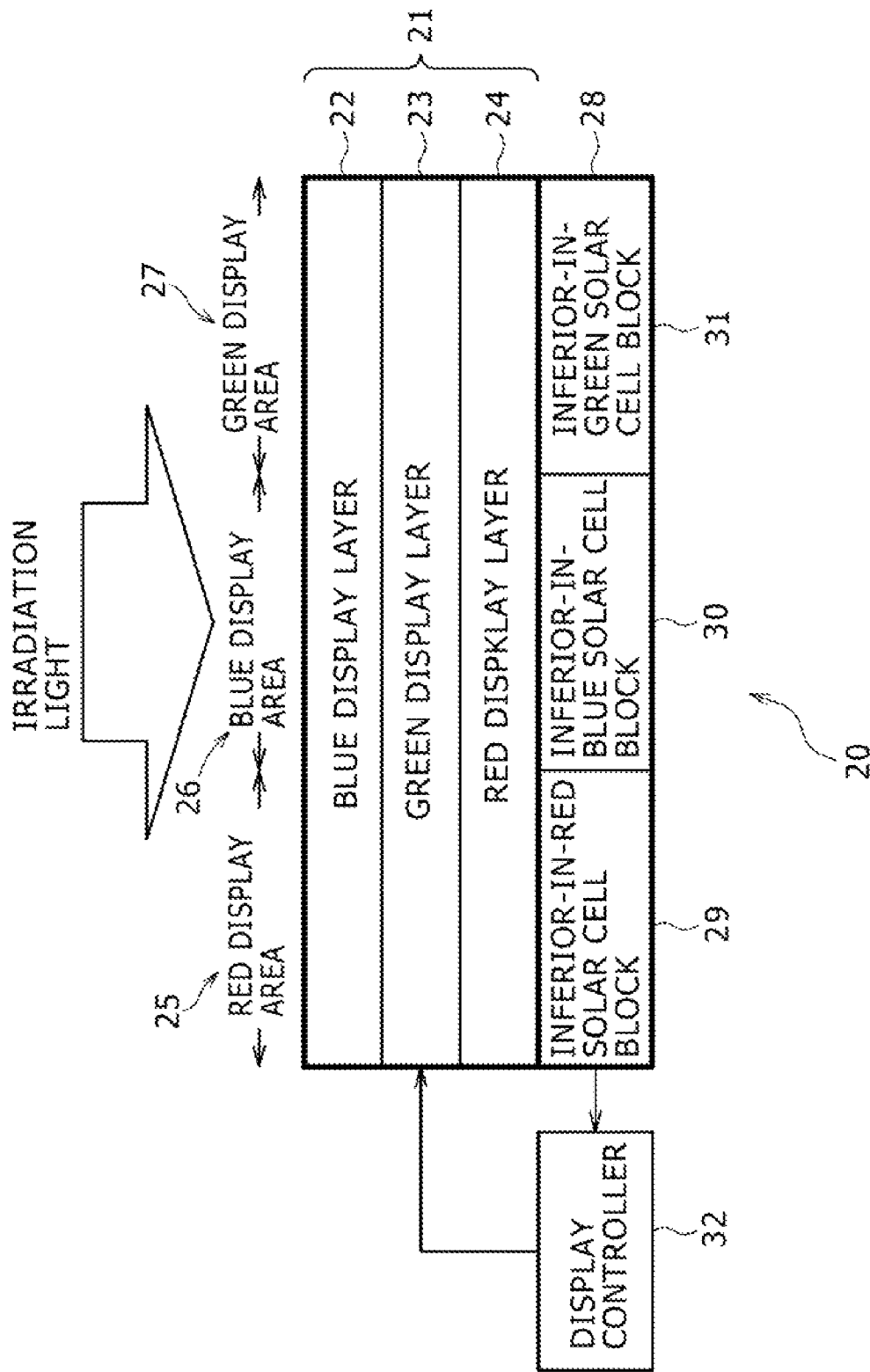
FIG. 3 is a block diagram showing a first configuration example of a display device to which an embodiment of the present invention is applied.

FIG. 3 shows a first configuration example of a display device according to one embodiment of the present invention. A display device 20 includes a full-color electronic paper 21 that displays characters, graphics, and so on, a dye-sensitized solar cell 28, and a display controller 32. The dye-sensitized solar cell 28 is disposed on the backside of the full-color electronic paper 21 and converts irradiation light that has transmitted through the full-color electronic paper 21 into power. The display controller 32 operates by using the power generated by the dye-sensitized solar cell 28 as its operating power to thereby control the displaying of the full-color electronic paper 21.

Figure 4:
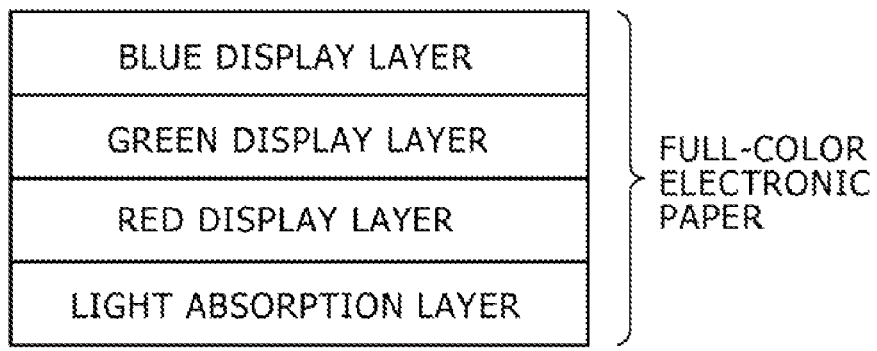
FIG. 4 is a block diagram showing a configuration example of a typical full-color electronic paper.

A description will be made below about a typical full-color electronic paper employing a cholesteric liquid crystal with reference to FIG. 4. A typical full-color electronic paper includes a blue display layer, green display layer, red display layer, and light absorption layer.

Each of these color display layers has a characteristic of being capable of allowing the transmission of light or reflecting light depending on the way of voltage application to the layer. The light absorption layer has a characteristic of absorbing light that has transmitted through the display layers to thereby prevent reflection of the light. For example, when red light is reflected by the red display layer, a human visually recognizes red color. In contrast, when red light transmits through the red display layer, the red light is absorbed by the light absorption layer and thus a human does not visually recognize red color. By implementing control so that each of light beams with specific wavelengths can be reflected by or transmit through the display layers in this manner, characters and graphics can be displayed in full color.

Figure 5:
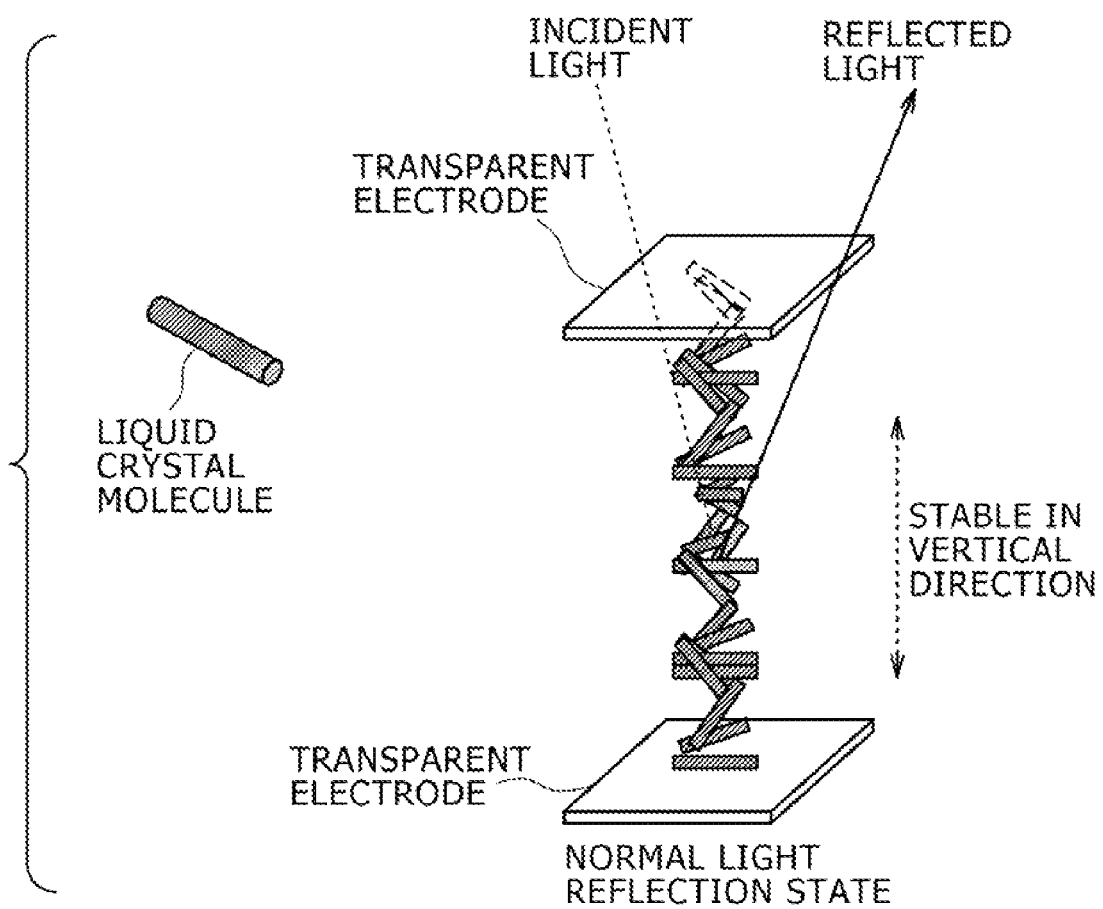
FIG. 5 is a diagram for explaining the characteristic of a display layer of a full-color electronic paper.

Whether light transmits or is reflected can be controlled depending on the way of voltage application to the cholesteric liquid crystal. As shown in FIG. 5, molecules of a cholesteric liquid crystal have a helical structure. As shown in FIG. 6, when a low voltage is applied to the cholesteric liquid crystal, the helical axis of the molecular structure is kept perpendicular to the voltage application direction, and thus incident light is allowed to transmit through the cholesteric liquid crystal layer. In contrast, as shown in FIG. 7, when a high voltage is applied to the cholesteric liquid crystal and then the voltage is sharply decreased, the helical axis of the molecular structure becomes parallel to the voltage application direction, and thus incident light is reflected. This state is maintained even after the cut-off of the voltage, and thus displayed content is kept even when power supply is absent, i.e., the memory function as one advantage of electronic papers can be realized.

Providing the display layer with the reflection function can be realized by adjusting the twist pitch of the cholesteric liquid crystal (hereinafter, referred to as the helical pitch). It is known that the wavelength of reflection-target light changes in proportion to the helical pitch. Therefore, proper design of the helical pitch allows the display layer to have a desired reflection property.

The blue display layer reflects, of irradiation light, blue light around a wavelength of 450 nm to thereby display characters and so on in blue, while allows the transmission of light with other wavelengths. The green display layer reflects, of irradiation light, green light around a wavelength of 550 nm to thereby display characters and so on in green, while allows the transmission of light with other wavelengths. The red display layer reflects, of irradiation light, red light around a wavelength of 650 nm to thereby display characters and so on in red, while allows the transmission of light with other wavelengths. Furthermore, light that has transmitted through all the display layers is absorbed by the light absorption layer disposed on the backside of the red display layer. Therefore, the light that has transmitted through all the display layers is not reflected.

Thus, by properly combining the displaying of the blue display layer, green display layer, and red display layer, the full-color electronic paper can display characters and so on in any optional color.

Similarly to the above-described typical full-color electronic paper, the full-color electronic paper 21 of the display device 20 to which an embodiment of the present invention is applied has three cholesteric liquid crystal layers (a blue display layer 22, a green display layer 23, and a red display layer 24).

In the present embodiment, the display area of the full-color electronic paper 21 is divided into three areas: a red display area 25 for displaying only red, a blue display area 26 for displaying only blue, and a green display area 27 for displaying only green. In each display area, characters and so on are displayed in a single color of red, blue, or green. The display device 20 does not include a light absorption layer, which is included in the typical full-color electronic paper.

Presently, the power generation efficiency of a dye-sensitized solar cell is lower than that of an existing solar cell employing silicon (Si). However, the dye-sensitized solar cell has the following advantages: there is a possibility that it can be manufactured at lower costs because silicon is not used; it has high mass-production efficiency because the manufacturing steps thereof are equivalent to those of a liquid crystal display; dyeing thereof is easy because an organic dye is used; the light absorption property thereof can be controlled through selection of an organic dye; it can be bent because a glass substrate is not used; and it can be formed into a thinner shape.

As the organic dye, the following dyes are known: a phenylxanthene dye, phthalocyanine dye, coumarin dye, cyanine dye, merocyanine dye, porphyrin dye, and proflavine dye. These dyes have different coloring properties as well as different light absorption properties. Merely through use of any single dye of these dyes or combining of any plural dyes, a characteristic can be given to the light absorption property, and the coloring property can be controlled. Furthermore, it is also expected that a dye for a further-limited wavelength band will be invented in the future research and development. Therefore, the light absorption property and the coloring property can be controlled by utilizing these dyes.

In terms of utilization of the above-described feature of being capable of controlling the light absorption property, the dye-sensitized solar cell 28 is formed of three blocks that are each inferior in the absorption property for light having a predetermined wavelength (an inferior-in-red solar cell block 29, an inferior-in-blue solar cell block 30, and an inferior-in-green solar cell block 31).

The inferior-in-red solar cell block 29 can hardly convert red light around a wavelength of 650 nm into power but can convert light with other wavelengths such as blue light around a wavelength of 450 nm and green light around a wavelength of 550 nm into power. The inferior-in-blue solar cell block 30 can hardly convert blue light around a wavelength of 450 nm into power but can convert light with other wavelengths such as red light around a wavelength of 650 nm and green light around a wavelength of 550 nm into power. The inferior-in-green solar cell block 31 can hardly convert green light around a wavelength of 550 nm into power but can convert light with other wavelengths such as blue light around a wavelength of 450 nm and red light around a wavelength of 650 nm into power.

The blocks of the dye-sensitized solar cell 28 and the display areas of the full-color electronic paper 21 have the arrangement relationship shown in FIG. 3. Specifically, the inferior-in-red solar cell block 29 is disposed on the backside of the red display area 25. The inferior-in-blue solar cell block 30 is disposed on the backside of the blue display area 26. The inferior-in-green solar cell block 31 is disposed on the backside of the green display area 27.

That is, in the display device 20 according to the present embodiment, a solar cell having high power generation efficiency with respect to colors other than the color displayed in the corresponding display area (i.e., light having the wavelengths corresponding to the colors) is disposed on the backside of the electronic paper. Therefore, even when the displaying state of the electronic paper varies, it is possible to minimize the change of the amount of light as the power generation target, reaching the surface of the solar cell. For example, there will be a case where blue is displayed in the entire blue display area, and a case where all of incident light transmits through the electronic paper in the entire blue display area.

When blue is displayed in the entire blue display area, frequency components in incident light other than the frequency component for blue transmit through the electronic paper with a predetermined transmittance and enter the solar cell. If this solar cell disposed on the backside of the electronic paper has high power generation efficiency with respect to light corresponding to colors other than blue, the total power generation efficiency does not greatly change compared with the case where all incident light transmits through the electronic paper.

In terms of this viewpoint, the display device 20 employs the above-described arrangement configuration. This can realize stable power supply.

A description will be made below about the operation of the display device 20 by using an example shown in FIG. 8. In this example, red characters "HOLIDAY SPECIAL PRICE!" are displayed in the red display area 25, blue characters "¥9800" are displayed in the blue display area 26, and green characters "ONLY 10 PRODUCTS" are displayed in the green display area 27.

For the respective display layers from the blue display layer 22 to the red display layer 24 under the red display area 25, the display controller 32 implements voltage application control in the following manner. Specifically, a comparatively high voltage is applied only to a part of the red display layer 24 (part corresponding to the characters "HOLIDAY SPECIAL PRICE!") so that red light can be reflected by this part. In contrast, a comparatively low voltage is applied to the other part of the red display layer 24 (part over which characters are not displayed) and the blue and green display layers 22 and 23 so that the irradiation light can transmit therethrough.

For the respective display layers from the blue display layer 22 to the red display layer 24 under the blue display area 26, the display controller 32 implements voltage application control in the following manner. Specifically, a comparatively high voltage is applied only to a part of the blue display layer 22 (part corresponding to the characters "¥9800") so that blue light can be reflected by this part. In contrast, a comparatively low voltage is applied to the other part of the blue display layer 22 (part over which characters are not displayed) and the green and red display layers 23 and 24 so that the irradiation light can transmit therethrough.

For the respective display layers from the blue display layer 22 to the red display layer 24 under the green display area 27, the display controller 32 implements voltage application control in the following manner. Specifically, a comparatively high voltage is applied only to a part of the green display layer 23 (part corresponding to the characters "ONLY 10 PRODUCTS") so that green light can be reflected by this part. In contrast, a comparatively low voltage is applied to the other part of the green display layer 23 (part over which characters are not displayed) and the blue and red display layers 22 and 24 so that the irradiation light can transmit therethrough.

Due to this displaying control, as shown in FIG. 9, the inferior-in-red solar cell block 29 in the dye-sensitized solar cell 28 is typically irradiated with light other than the red light as the irradiation light that has transmitted through the full-color electronic paper 21. Furthermore, the inferior-in-blue solar cell block 30 is irradiated with light other than the blue light as the irradiation light that has transmitted through the full-color electronic paper 21. Moreover, the inferior-in-green solar cell block 31 is irradiated with light other than the green light as the irradiation light that has transmitted through the full-color electronic paper 21. Consequently, the dye-sensitized solar cell 28 can achieve stable power generation efficiency irrespective of the displayed content on the full-color electronic paper 21.

Figure 10:
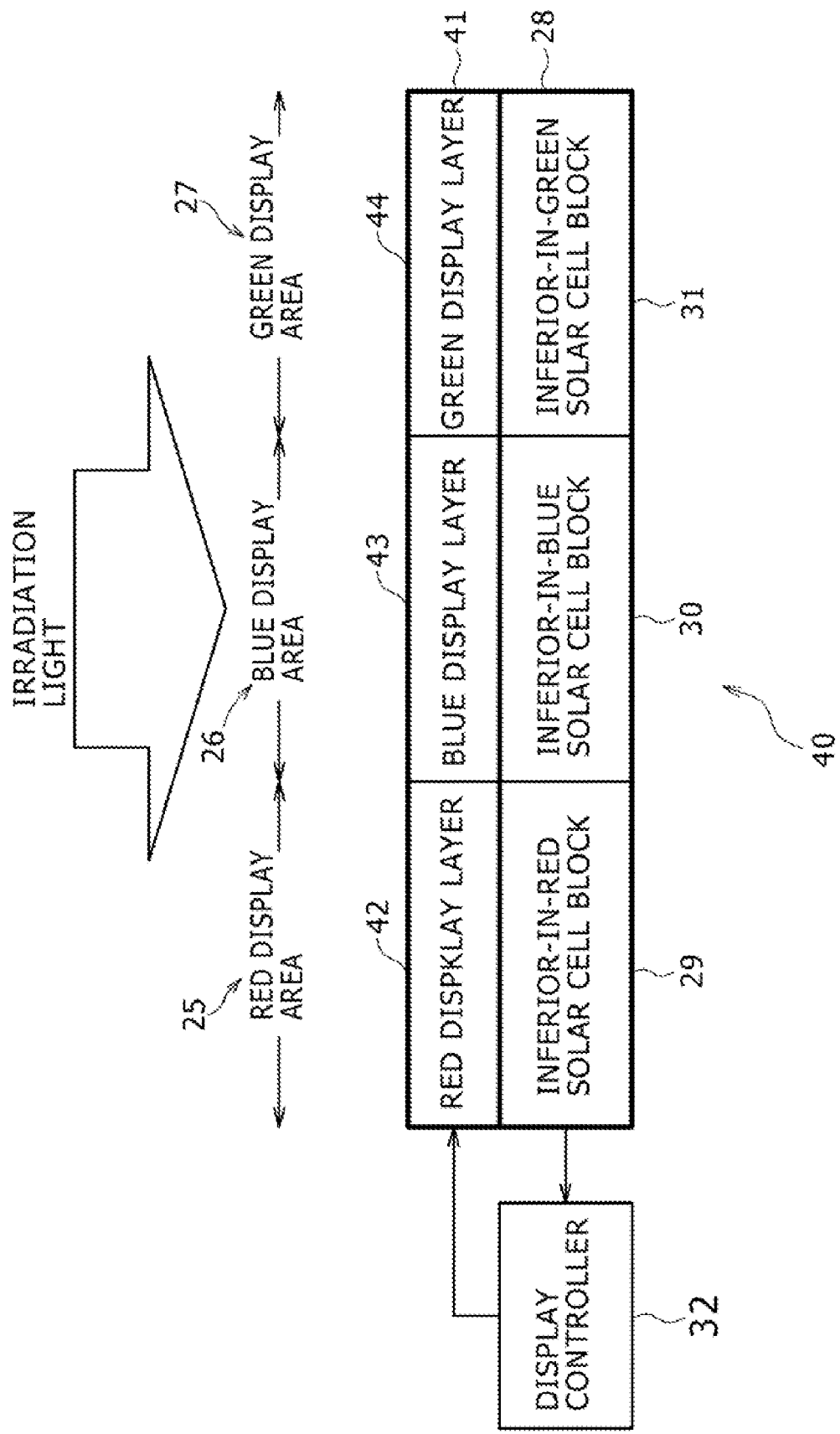
FIG. 10 is a block diagram showing a second configuration example of a display device to which an embodiment of the present invention is applied.

FIG. 10 shows a second configuration example of a display device according to one embodiment of the present invention. A display device 40 is obtained by replacing the full-color electronic paper 21 of the display device 20 shown in FIG. 3 by a color electronic paper 41.

In the full-color electronic paper 21 of the display device 20 shown in FIG. 3, all of three layers (red, green, and blue) are overlapped with each other across the entire display area. However, a configuration like that of the color electronic paper 41 of the display device 40 is also available. Specifically, in this configuration, over an inferior-in-red solar cell block 29, a green display layer 44 and a blue display layer 43 are not disposed but only a red display layer 42 is disposed. Over an inferior-in-blue solar cell block 30, the red display layer 42 and the green display layer 44 are not disposed but only the blue display layer 43 is disposed. Over an inferior-in-green solar cell block 31, the red display layer 42 and the blue display layer 43 are not disposed but only the green display layer 44 is disposed.

Thus, the configuration can be simplified compared with the display device 20, and the light transmittance of the electronic paper can be enhanced for the respective solar cell blocks.

In addition, similarly to the display area of the full-color electronic paper 21 of the display device 20, the display area of the color electronic paper 41 is divided into three areas: a red display area 25 for displaying only red, a blue display area 26 for displaying only blue, and a green display area 27 for displaying only green.

The same components of the display device 40 as those of the display device 20 are given the same numerals, and therefore the description thereof is omitted.

The operation of the display device 40 will be described below by using the displaying example shown in FIG. 8.

For the red display area 25, a display controller 32 implements voltage application control in the following manner. Specifically, a comparatively high voltage is applied only to a part of the red display layer 42 (part corresponding to the characters "HOLIDAY SPECIAL PRICE!") under the red display area 25 so that red light can be reflected by this part. In contrast, a comparatively low voltage is applied to the other part of the red display layer 42 (part over which characters are not displayed) and the blue and green display layers 43 and 44 so that the irradiation light can transmit therethrough.

For the blue display area 26, the display controller 32 implements voltage application control in the following manner. Specifically, a comparatively high voltage is applied only to a part of the blue display layer 43 (part corresponding to the characters "¥9800") under the blue display area 26 so that blue light can be reflected by this part. In contrast, a comparatively low voltage is applied to the other part of the blue display layer 43 (part over which characters are not displayed) and the green and red display layers 44 and 42 so that the irradiation light can transmit therethrough.

For the green display area 27, the display controller 32 implements voltage application control in the following manner. Specifically, a comparatively high voltage is applied only to a part of the green display layer 44 (part corresponding to the characters "ONLY 10 PRODUCTS") under the green display area 27 so that green light can be reflected by this part. In contrast, a comparatively low voltage is applied to the other part of the green display layer 44 (part over which characters are not displayed) and the blue and red display layers 43 and 42 so that the irradiation light can transmit therethrough.

Figure 11:
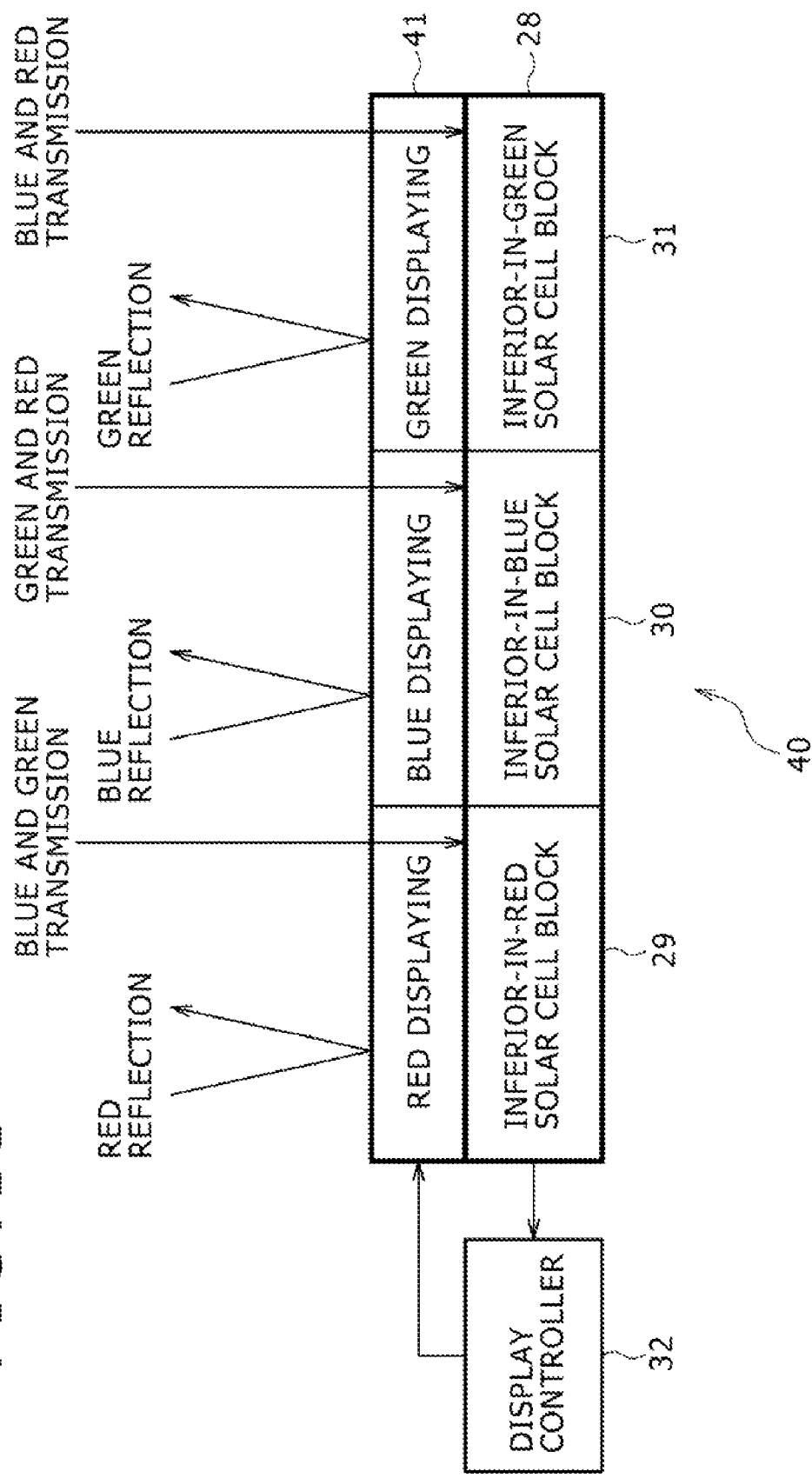
FIG. 11 is a diagram for explaining the power generation efficiency in the display device of FIG. 10.

Due to this displaying control, as shown in FIG. 11, the inferior-in-red solar cell block 29 in a dye-sensitized solar cell 28 is typically irradiated with light other than the red light as the irradiation light that has transmitted through the color electronic paper 41. Furthermore, the inferior-in-blue solar cell block 30 is irradiated with light other than the blue light as the irradiation light that has transmitted through the color electronic paper 41. Moreover, the inferior-in-green solar cell block 31 is irradiated with light other than the green light as the irradiation light that has transmitted through the color electronic paper 41. Consequently, the dye-sensitized solar cell 28 can achieve stable power generation efficiency irrespective of the displayed content on the color electronic paper 41.

Specifically, even when an area in which red characters or graphics are displayed changes, green light and blue light enter the inferior-in-red solar cell block 29 constantly, and thus the power generation efficiency of the inferior-in-red solar cell block 29 does not change. Similarly, even when an area in which blue characters or graphics are displayed changes, red light and green light enter the inferior-in-blue solar cell block 30 constantly, and thus the power generation efficiency of the inferior-in-blue solar cell block 30 does not change. Similarly, even when an area in which green characters or graphics are displayed changes, red light and blue light enter the inferior-in-green solar cell block 31 constantly, and thus the power generation efficiency of the inferior-in-green solar cell block 31 does not change. Thus, even when displaying of characters or graphics changes, stable power generation efficiency can be obtained.

It should be noted that embodiments of the present invention can be applied also to a display device that does not display all of three colors of red, blue, and green but displays only one of these colors unlike the above-described first and second configuration examples.

Embodiments of the present invention can be applied to e.g. IC (Integrated Circuit) cards, besides electronic devices including a solar cell and a display.

It should be noted that embodiments of the present invention are not limited to the above-described embodiments but various modifications might be incorporated therein without departing from the scope and spirit of the present invention.

What is claimed is:

1. An electronic device comprising:
 a first solar cell having a block configured to be inferior in absorption efficiency for light having a predetermined wavelength; and
 a reflective display configured to carry out displaying by reflecting light having the predetermined wavelength and allow transmission of light other than light having the predetermined wavelength; wherein
 the reflective display is configured to vary an amount of light having the predetermined wavelength that is reflected;
 the reflective display is disposed on an outside face of a device package;
 the block of the solar cell is disposed on a backside of the reflective display;
 the block has a power generation efficiency, for light having a wavelength other than the predetermined wavelength, which is higher than a power generation efficiency for the light having the predetermined wavelength; and
 there is substantially no change in a total power generation efficiency of power converted by the block from the light having the predetermined wavelength when the amount of reflected light having the predetermined wavelength is varied.

2. The electronic device according to claim 1, wherein the first solar cell includes a plurality of blocks that are each inferior in absorption efficiency for light having a respective one of wavelengths different from each other, and
 the reflective display includes a plurality of display areas that each carry out displaying by reflecting light having a respective one of wavelengths different from each other and allow transmission of light other than light having the predetermined wavelength.

3. The electronic device according to claim 1, wherein the solar cell is a dye-sensitized solar cell.

4. The electronic device according to claim 1, wherein the reflective display is an electronic paper.

* * * * *